Oct. 16, 1928.
R. A. CLARKE
RADIOCIRCUITS
Filed Feb. 18, 1925
1,688,265
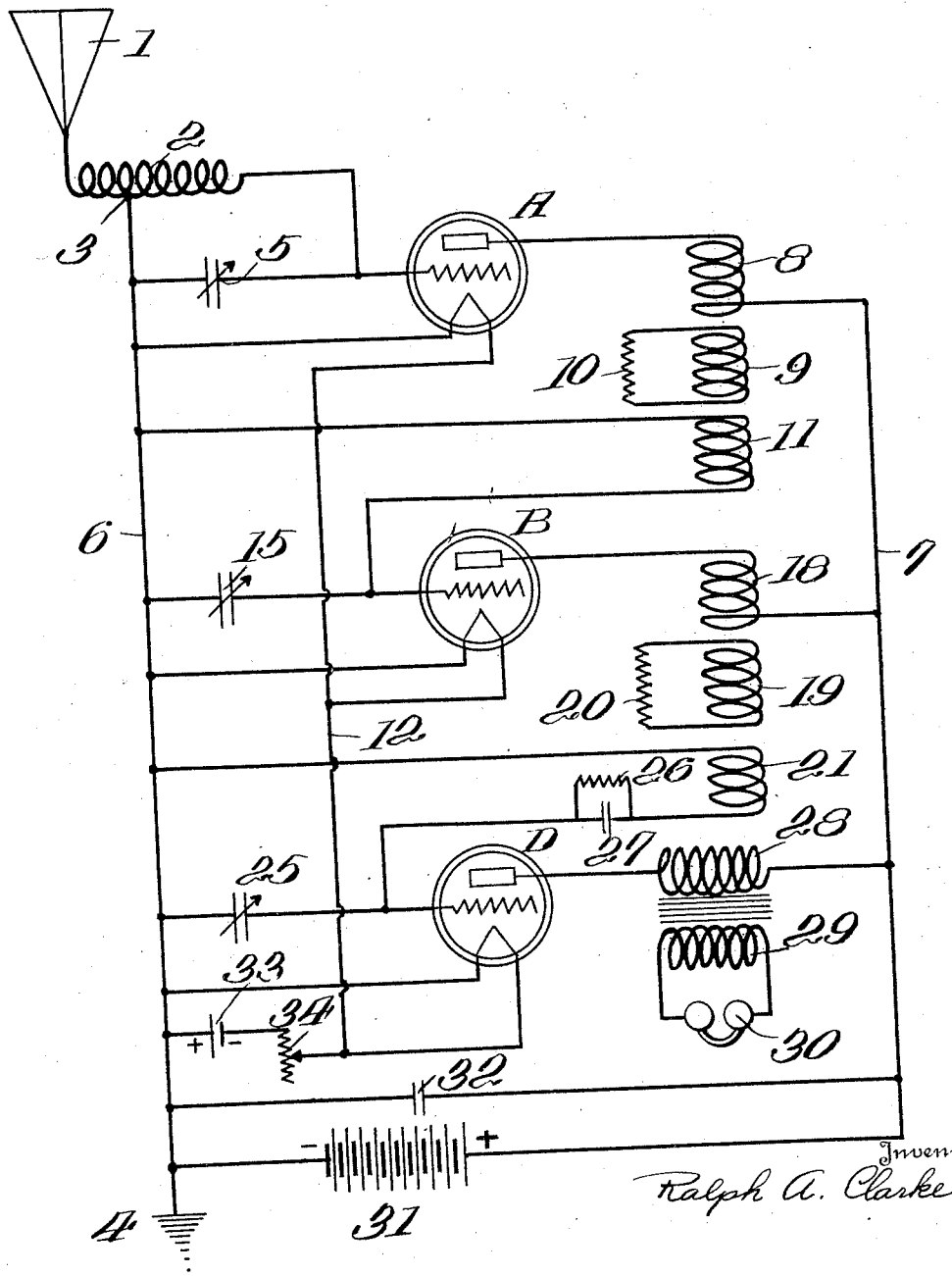
Inventor
Ralph A. Clarke
By Sturtevant & Mason
Attorneys Patented Oct. 16, 1928.

1,688,265

UNITED STATES PATENT OFFICE.

RALPH A. CLARKE, OF WORCESTER, MASSACHUSETTS, ASSIGNOR TO STANDARD RADIO CORPORATION, OF WORCESTER, MASSACHUSETTS, A CORPORATION OF MASSACHUSETTS.

RADIOCIRCUITS.

Application filed February 18, 1925. Serial No. 9,988.

This invention relates to certain improvements in radio circuits, and more particularly to means for controlling or stabilizing inductance-coupled circuits.

Excessive regeneration between the grid and plate circuits of a vacuum tube, more particularly with circuits tuned to radio frequencies, gives rise to undesirable oscillations and results in whistling or drumming sounds in the current indicator. On the other hand, a certain amount of regeneration appears essential to operation, and the amount of amplification obtained increases with the increase of regeneration.

Multiple radio frequency amplifiers of the inductance-coupled type are peculiarly subject to disturbances or oscillations when the successive stages are tuned to resonance with the incoming wave. This tendency is so much the greater when the circuits of the various tubes have common leads, as for example, when common filament and anode batteries are used, or when each circuit is grounded to avoid untoward capacitative disturbances in the set. While many ways have been proposed to correct this tendency toward excessive regeneration, these usually depend upon apparatus which reduces the volume to a corresponding degree; and in fact, may be held to operate by merely reducing the volume both of signal and disturbance.

In the present invention, an independent closed circuit winding is placed on the transformer constituting the coupling inductances; and serves to reduce the volume of the disturbances in far greater proportion than it reduces the volume of the signal transmission.

The invention has been described in the following specification in the form found preferable in practical operation in conjunction with the accompanying drawing in which the figure is a diagrammatical representation of a circuit system which may be employed.

The antenna 1 is connected to one end of an inductance coil 2; and the antenna circuit is completed from a tap 3 on this coil 2 by a bus wire 6 to the ground 4. It has been found desirable, for constructional reasons, to make the inductance 2 of "spider web" form, and to have relatively few turns in the antenna circuit, to obtain a balance between the sharp tuning attainable with loose coupling, and the reduction of signal strength resulting from too few turns.

The other end of the inductance coil 2 is connected to the grid of the three-electrode amplifying repeater A, and with the variable condenser 5 shunting the secondary part of coil 2 constitutes a circuit which may be readily tuned to resonance with the desired incoming wave. The anode of the repeater A is connected through an inductance coil 8 to the bus wire 7 leading to the positive pole of the plate battery 31.

In electromagnetic relation to the inductance coil 8 is another inductance coil 11 having its terminals connected respectively to the bus wire 6 and to the grid of the second three-electrode amplifying repeater B. This input circuit to repeater B is readily tuned by a variable condenser 15 shunting the coil 21 to resonance with the desired incoming wave. The anode of tube A is connected through an inductance coil 18 to the bus wire 7.

In electromagnetic relation to the inductance coil 18, is another inductance coil 21 having its terminals connected respectively to the bus wire 6 and to the grid of the third three-electrode tube D, here utilized as a detector, through the grid leak 26 and condenser 27. This input circuit is readily tuned, by a variable condenser 25 shunting the coil 21, to resonance with the desired incoming wave. The anode of the detector tube D is connected through an inductance coil 28 to the bus wire 7.

The inductance coil 28 is the primary of an audio frequency transformer having a secondary coil 29 connected in known manner to an indicating device here shown as a telephone headpiece 30.

The filaments of the tubes A, B and D are connected respectively to the bus wire 6 and to the bus wire 12 leading to the negative pole of the filament heating or "A" battery 33, with the customary interposition of a rheostat 34.

The inductance coils 8 and 18 are made preferably with relatively few turns to obtain a loose coupling in the transformers. This also permits an untuned anode or output circuit, and eliminates the necessity of an additional control element for each tube.

The anode battery 31 is connected at its negative pole to the bus wire 6 and at its positive pole to the bus wire 7, and is shunted by the bypass condenser 32.

Interposed between the coils 8, 11 and 18, 21 of the transformers associated with the output circuits of the amplifying tubes A and B, are the tertiary inductance windings 9 and 19, respectively. These windings have their circuits closed through the resistors 10 and 20.

In operation, the variable condensers 5, 15 and 25 are set at such positions as to place the respective associated input circuits of the tubes in resonance with the desired incoming wave. It will then be found when the resistors 10 and 20 are removed, that whistling and rustling noises are heard at the receiver 30, owing to the regeneration occurring between the input and output circuits of each tube, and between the circuits of the several tubes. Upon replacing the resistors 10 and 20, these extraneous noises disappear and the variable condensers 5, 15 and 25 may be adjusted to exact resonance without distortion of the tone. The reduction in volume is very small.

In actual construction, it has been found that by using a spider web coil wound in four sections of respectively, twenty-five, twelve, ten and twenty-nine turns from the center, and of about two inches internal and three and one-half inches external diameter, with the outer windings in series (58 turns) as a secondary, the twelve-turn windings as a primary, and the ten-turn winding as a guard, very satisfactory results are obtained when the resistors 10 and 20 are of about two thousand ohms resistance. Obviously, their exact resistance varies with the frequency range to be covered, which in the case described was 250 to 600 meters; and with the other constants of the set in question.

The use of such a stabilizer permits the use of bus wires and simple connections and less care need be employed to maintain the conductors spaced. The use of a ground conductor for each circuit eliminates the effect of body capacity. In particular, in the apparatus described, the only independent circuits are those of the tertiary or guard windings.

It will be understood that this invention is in no wise limited to the particular arrangement nor sizes of parts described, and shown, but that any modifications may be made therein within the scope of the appended claims.

Having thus described the invention, what I claim as new and desire to secure by Letters Patent, is—

1. In a radio frequency amplifying system, a plurality of three-electrode electron discharge repeaters with output and tuned input circuits, transformers electro-magnetically coupling the output and input circuits of successive repeaters, an untuned tertiary winding in said transformers interposed between the primary and secondary windings, and a resistance short-circuiting said tertiary winding.

2. In a radio frequency amplifying system comprising a pair of three-electrode electron discharge repeaters having input and output circuits, a transformer having its primary in the output circuit of one of said repeaters and its secondary in the input circuit of the other of said repeaters, an untuned tertiary winding in said transformer interposed between said primary and said secondary, and a resistor to short-circuit said tertiary winding.

3. In a radio frequency amplifying system comprising a pair of three-electrode electron discharge repeaters having input and output circuits, a transformer having its primary in the output circuit of one of said repeaters and its secondary in the input circuit of the said transformer and an untuned tertiary winding interposed between said primary and said secondary, and a resistor short-circuiting said tertiary winding.

In testimony whereof, I affix my signature.

RALPH A. CLARKE.